(12) United States Patent
Sprague et al.

(10) Patent No.: US 9,148,388 B2
(45) Date of Patent: Sep. 29, 2015

(54) METHODS, SYSTEMS, AND COMPUTER READABLE MEDIA FOR PERFORMING ENHANCED SERVICE ROUTING

(71) Applicant: Tekelec, Inc., Morrisville, NC (US)

(72) Inventors: David Michael Sprague, Raleigh, NC (US); Seetharaman Khadri, Cary, NC (US); Komal G. Khungar, Morrisville, NC (US); Jeffrey Alan Craig, Durham, NC (US); Srikanth Nanjund Rao, Cary, NC (US)

(73) Assignee: TEKELEC, INC., Morrisville, NC (US)

( * ) Notice: Subject to any disclaimer, the term of this patent is extended or adjusted under 35 U.S.C. 154(b) by 124 days.

(21) Appl. No.: 13/901,534

(22) Filed: May 23, 2013

(65) Prior Publication Data

US 2014/0348176 A1    Nov. 27, 2014

(51) Int. Cl.
*H04L 12/931* (2013.01)
*H04L 29/08* (2006.01)

(52) U.S. Cl.
CPC ............. *H04L 49/35* (2013.01); *H04L 67/327* (2013.01); *H04L 67/32* (2013.01)

(58) Field of Classification Search
CPC ........ H04L 49/35; H04L 67/327; H04L 67/32
USPC ........... 370/401; 709/203, 223, 224, 225, 226
See application file for complete search history.

(56) References Cited

U.S. PATENT DOCUMENTS

| | | | |
|---|---|---|---|
| 5,228,083 A | 7/1993 | Lozowick et al. | |
| 6,304,273 B1 | 10/2001 | Bonnet | |
| 6,584,073 B1 | 6/2003 | Steele, Jr. et al. | |
| 6,795,546 B2 | 9/2004 | Delaney et al. | |
| 6,954,790 B2 | 10/2005 | Forslöw | |
| 6,967,956 B1 | 11/2005 | Tinsley et al. | |
| 7,043,000 B2 | 5/2006 | Delaney et al. | |
| 7,136,635 B1 | 11/2006 | Bharatia et al. | |
| 7,286,516 B2 | 10/2007 | Delaney et al. | |
| 7,383,298 B2 | 6/2008 | Palmer et al. | |
| 7,403,537 B2 | 7/2008 | Allison et al. | |

(Continued)

FOREIGN PATENT DOCUMENTS

| | | |
|---|---|---|
| CA | 2 716 544 A1 | 12/2010 |
| CN | 101136943 A | 3/2008 |

(Continued)

OTHER PUBLICATIONS

Interview Summary for U.S. Appl. No. 13/026,098 (May 23, 2013).
Notice of Allowance and Fee(s) Due for U.S. Appl. No. 13/026,098 (Mar. 11, 2013).
Communication of European Publication Number and Information on the Application of Article 67(3) EPC for European Patent Application No. 11742912.6 (Nov. 21, 2012).

(Continued)

*Primary Examiner* — Brian D Nguyen
(74) *Attorney, Agent, or Firm* — Jenkins, Wilson, Taylor & Hunt, P.A.

(57) ABSTRACT

Methods, systems, and computer readable media for performing enhanced service routing are disclosed. One method includes receiving, at a Diameter application executing on a message processor associated with a DSR, a Diameter message that requires a service. The method also includes determining, using service routing data, at least one service provider for performing the service associated with the Diameter message, wherein the service routing data is based on service capability information provided by a plurality of service providers and sending the Diameter message or a portion of the Diameter message to the at least one service provider for performing the service.

25 Claims, 5 Drawing Sheets

(56) References Cited

U.S. PATENT DOCUMENTS

| | | | |
|---|---|---|---|
| 7,466,807 | B2 | 12/2008 | McCann et al. |
| 7,633,872 | B2 | 12/2009 | Pitcher et al. |
| 7,633,969 | B2 | 12/2009 | Caugherty et al. |
| 7,706,343 | B2 | 4/2010 | Delaney et al. |
| 7,894,353 | B2 | 2/2011 | Li et al. |
| 7,916,685 | B2 | 3/2011 | Schaedler et al. |
| 7,961,685 | B2 | 6/2011 | Suh et al. |
| 7,996,007 | B2 | 8/2011 | Bantukul |
| 7,996,541 | B2 | 8/2011 | Marathe et al. |
| 8,041,021 | B2 | 10/2011 | Xu et al. |
| 8,045,983 | B2 | 10/2011 | Bantukul |
| 8,483,233 | B2 | 7/2013 | Craig et al. |
| 2002/0069278 | A1 | 6/2002 | Forslow |
| 2002/0087723 | A1 | 7/2002 | Williams et al. |
| 2002/0181507 | A1 | 12/2002 | Jones |
| 2004/0194085 | A1 | 9/2004 | Beaubien et al. |
| 2006/0069777 | A1 | 3/2006 | Kato et al. |
| 2006/0101159 | A1 | 5/2006 | Yeh et al. |
| 2007/0025539 | A1* | 2/2007 | Claudatos et al. ....... 379/211.02 |
| 2007/0047539 | A1 | 3/2007 | Agarwal et al. |
| 2008/0025230 | A1 | 1/2008 | Patel et al. |
| 2009/0080440 | A1 | 3/2009 | Balyan et al. |
| 2010/0265948 | A1 | 10/2010 | Patel et al. |
| 2012/0081557 | A1* | 4/2012 | Kupinsky et al. .......... 348/207.1 |
| 2013/0316699 | A1* | 11/2013 | Jheng et al. ................... 455/423 |
| 2014/0123204 | A1* | 5/2014 | Moon et al. ................... 725/131 |
| 2014/0162663 | A1* | 6/2014 | Shaw et al. ................... 455/445 |
| 2014/0171089 | A1* | 6/2014 | Janakiraman et al. ........ 455/445 |
| 2014/0213265 | A1* | 7/2014 | Agarwal ...................... 455/445 |
| 2014/0278859 | A1* | 9/2014 | Gallucci et al. ............ 705/14.16 |

FOREIGN PATENT DOCUMENTS

| | | |
|---|---|---|
| EP | 1 314 324 B1 | 8/2008 |
| EP | 1 847 076 B1 | 2/2012 |
| WO | WO 2008/087633 A2 | 7/2008 |
| WO | WO 2009/070179 A1 | 6/2009 |
| WO | WO 2011/100610 A2 | 8/2011 |

OTHER PUBLICATIONS

Fajardo et al., "Diameter Base Protocol," Internet Engineering Task Force (IETF), RFC 6733, pp. 1-152 (Oct. 2012).

Non-Final Official Action for U.S. Appl. No. 13/026,098 (Sep. 20, 2012).

Notification of Transmittal of the International Search Report and the Written Opinion of the International Searching Authority, or the Declaration for International Application No. PCT/US2011/024622 (Oct. 31, 2011).

Traffix Systems, "Datasheet; Traffix Signaling Delivery Controller (SDC)," pp. 1-5 (May 2011).

Znaty, "Diameter, GPRS, (LTE + ePC = EPS), IMS, PCC and SDM," EFORT (May 2010). (Part 1 of 2, pp. 1-229.

Znaty, "Diameter, GPRS, (LTE + ePC = EPS), IMS, PCC and SDM," EFORT (May 2010). (Part 2 of 2, pp. 230-460).

3GPP, "3rd Generation Partnership Project; Technical Specification Group Core Network and Terminals; Diameter-based Protocols Usage and Recommendations in 3GPP (Release 9)," 3GPP TR 29.909 V9.0.0 (Dec. 2009).

Tsou et al., "Realm-Based Redirection in Diameter," Internet Engineering Task Force, draft-ietf-dime-realm-based-redirect-02, pp. 1-7 (Oct. 27, 2009).

Notification of Transmittal of the International Search Report and the Written Opinion of the International Searching Authority, or the Declaration for PCT International Application No. PCT/US2014/038830 (Aug. 11, 2014).

First Office Action for Chinese Patent Application No. 201180018670.0 (Jul. 14, 2014).

Oracle Communications Service Broker Concepts Guide, Release 5.0, pp. 1-106, (Dec. 31, 2010).

Extended European Search Report for European Patent Application No. 11742912.6 (Jun. 26, 2015).

Second Office Action for Chinese Patent Application No. 201180018670.0 (May 25, 2015).

Liu et al., "Introduction to Diameter," IBM Technical Library, http://www.ibm.com/developerworks/wireless/library/wi-diameted, pp. 1-9 (Jan. 24, 2006).

* cited by examiner

METHODS, SYSTEMS, AND COMPUTER READABLE MEDIA FOR PERFORMING ENHANCED SERVICE ROUTING

TECHNICAL FIELD

The subject matter described herein relates to performing routing at a Diameter node. More specifically, the subject matter relates to methods, systems, and computer readable media for performing enhanced service routing.

BACKGROUND

Diameter is an authentication, authorization and accounting (AAA) protocol for computer networks, and is a successor to RADIUS. The Diameter base protocol is defined in IETF RFC 6733, the disclosure of which is incorporated by reference herein in its entirety. A Diameter node may be any suitable entity (e.g., a computing platform, a processor, or device) executing a host process that implements a Diameter protocol. A message processor (MP) may be a suitable entity (e.g., a physical processor or a circuit board) that hosts a DSR signaling application. A Diameter agent may be a Diameter node that provides relay, proxy, redirect or translation services. A Diameter signaling router (DSR) may include one or more co-located MPs and may consist of one or more Diameter nodes or agents (e.g., a Diameter relay agent, a Diameter proxy agent, a Diameter translation agent, and/or a Diameter translation agent).

When a Diameter message is received at a DSR, the message may need to be processed by one or more Diameter applications. Conventional Diameter applications are configured to perform one or more services. However, one problem associated with such a configuration is that it is not scalable because each Diameter application may be configured to perform particular services by a network operator and such services may not be used by other Diameter applications. Further problems may arise when performing services remotely from a Diameter application.

Accordingly, in light of these difficulties, a need exists for methods, systems, and computer readable media for performing enhanced service routing.

SUMMARY

Methods, systems, and computer readable media for performing enhanced service routing are disclosed. One method includes receiving, at a Diameter application executing on a message processor associated with a DSR, a Diameter message that requires a service. The method also includes determining, using service routing data, at least one service provider for performing the service associated with the Diameter message, wherein the service routing data includes service capability information provided by a plurality of service providers, and sending the Diameter message or a portion of the Diameter message to the at least one service provider for performing the service.

A system for performing enhanced service routing at a Diameter signaling router (DSR) is also disclosed. The system includes a DSR comprising a non-transitory computer readable medium configured to store service routing data, wherein the wherein the service routing data includes service capability information provided by a plurality of service providers. The DSR also includes a message processor associated with the DSR and configured to receive, at a Diameter application executing on a message processor associated with the DSR, a Diameter message that requires a service, to determine, using service routing data, at least one service provider for performing the service associated with the Diameter message, and to send the Diameter message or a portion of the Diameter message to the at least one service provider for performing the service.

The subject matter described herein may be implemented in software in combination with hardware and/or firmware. For example, the subject matter described herein may be implemented as a function executed by a processor. In one exemplary implementation, the subject matter described herein for performing enhanced service routing may be implemented using a non-transitory computer readable medium to having stored thereon executable instructions that when executed by the processor of a computer control the processor to perform steps. Exemplary non-transitory computer readable media suitable for implementing the subject matter described herein include chip memory devices or disk memory devices accessible by a processor, programmable logic devices, and application specific integrated circuits. In addition, a computer readable medium that implements the subject matter described herein may be located on a single computing platform or may be distributed across plural computing platforms.

As used herein, the term "node" refers to a physical computing platform including one or more processors and memory.

As used herein, the terms "function" or "module" refer to software in combination with hardware and/or firmware for implementing features described herein.

BRIEF DESCRIPTION OF THE DRAWINGS

The subject matter described herein will now be explained with reference to the accompanying drawings of which.

DETAILED DESCRIPTION

The subject matter described herein includes methods, systems, and computer readable media for performing enhanced service routing. In some embodiments, the subject matter described herein may be implemented at a Diameter agent or a Diameter node, such as a Diameter signaling router (DSR). A DSR, a processor, a Diameter application, or a Diameter node according to some aspects of the subject matter disclosed herein may be configured to subscribe to or otherwise interact with one or more service providers. The subscribers may receive service capability information from the one or more service providers and may use this information to maintain service routing data. Service providers may include any entity (e.g., a database processor, a session binding repository, or a server) that provides or performs a service, such as a charging binding service, a domain name resolution service, or an international mobile subscriber identity (IMSI) resolution service. According to some aspects of the subject matter disclosed herein, a Diameter application executing on a DSR (or components therein) may be configured to determine, using service routing data based on service capability information and/or load balancing information (e.g., historical routing information), one or more service providers for performing a service associated with various messages, such as a Diameter message.

Advantageously, some aspects of the subject matter described herein allow decoupling of Diameter applications and Diameter services. By decoupling Diameter applications and Diameter services, Diameter service providers may be deployed independently from Diameter applications, thereby improving resource scalability and deployment flexibility. Advantageously, some aspects of the subject matter described herein allow a Diameter application to use one or more service providers to provide or perform certain services (e.g., conventionally provided or performed by the Diameter application). Advantageously, some aspects of the subject matter described herein allow multiple Diameter application to share services of one or more service providers and thereby may increase resource usage efficiency compared to conventional Diameter application that do not share resources (e.g., services).

Figure 1:
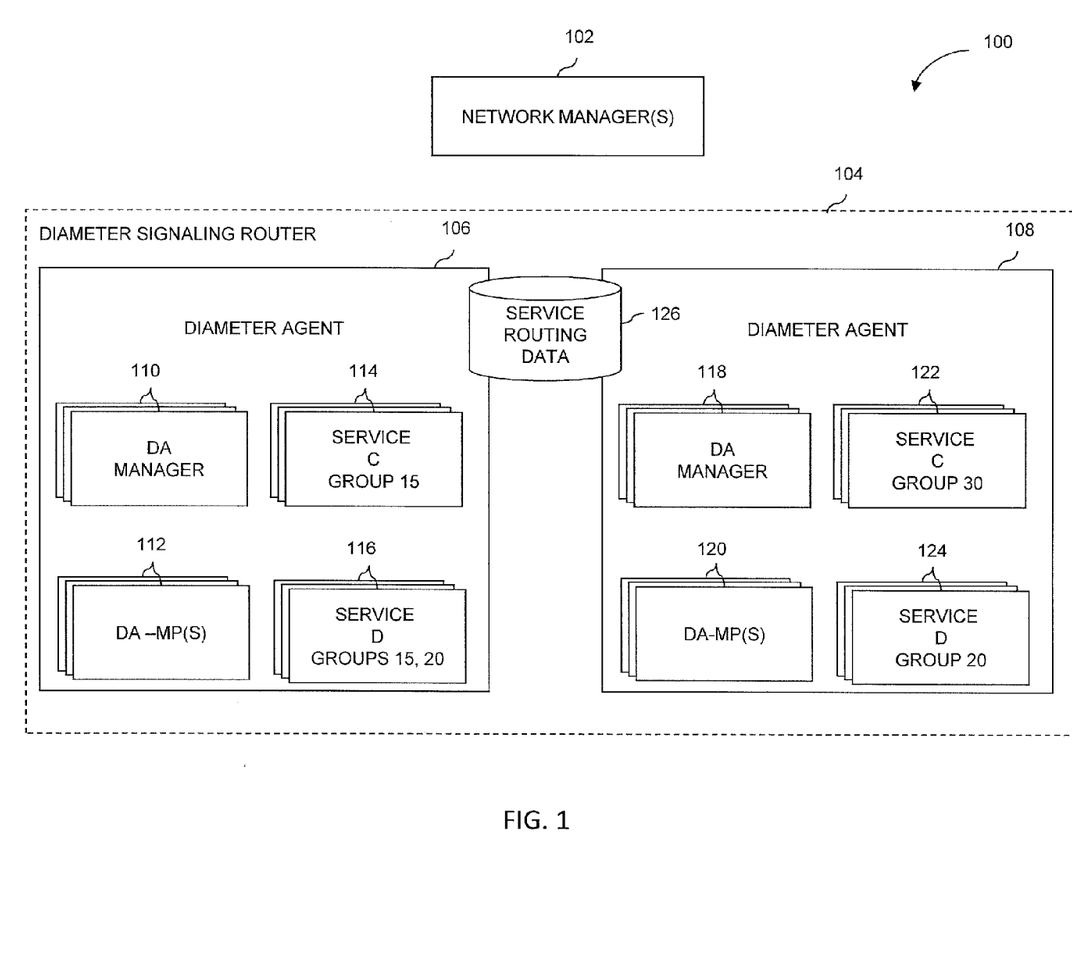
FIG. 1 is a diagram illustrating an exemplary environment for performing enhanced service routing according to an embodiment of the subject matter described herein.

FIG. 1 is a diagram illustrating an exemplary environment for performing enhanced service routing according to an embodiment of the subject matter described herein. Exemplary environment 100 may include one or more networks and may include one or more network manager(s) 102 and at least one DSR 104.

Network manager(s) 102 may represent any suitable entities for performing operations, administration, maintenance, and/or provisioning (OAM&P) associated with a network, DSR 104, and/or other networking nodes in environment 100. In some embodiments, network manager(s) 102 may represent a primary node and a backup or standby node for performing OAM&P or related functions. In some embodiments, network manager(s) 102 may configure DSR 104, or components therein. For example, a network operator using network manager(s) 102 may configure DSR 104, or components therein, to subscribe to one or more service providers. Network manager(s) 102 may also group service providers and determine redundancy configurations for various nodes.

DSR 104 may represent any suitable entity or entities (e.g., one or more computing platforms) for receiving, sending, and/or processing a variety of messages, including Diameter messages. For example, DSR 104 may comprise one or more network elements or nodes distributed across a physical area or location. DSR 104 may include functionality for communicating with numerous Diameter peer nodes, such as Diameter clients and Diameter servers. For example, Diameter nodes may send or receive Diameter messages via one or more interfaces associated with DSR 104.

DSR 104 may include functionality for performing enhanced service routing. DSR 104 may maintain service routing data and may use the service routing data for selecting one or more service providers for processing associated with received Diameter messages. DSR 104 may include functionality for routing, forwarding, translating, redirecting, or otherwise sending messages to one or more destinations, e.g., a Diameter server external to DSR 104 or a Diameter application executing on a message processor internal to DSR 104.

DSR 104 may include storage 126. Storage 126 may represent any suitable entity (e.g., a database computing platform) for storing or maintaining service routing data or related information. In some embodiments, service routing data may be derived from service capability information and/or load balancing information (e.g., historical routing information). Exemplary service routing data may include any information usable for determining or selecting appropriate service providers for performing services. For example, storage 126 may include service capability information associated with one or more service providers and service groups (e.g., groups of service providers). Exemplary service capability information may include operational status information, availability information, preference information, redundancy status information, processing capacity information, congestion information, physical location information, and/or grouping information. Exemplary historical information may include historical routing information, load balancing algorithms, or other load balancing information.

In some embodiments, service routing data (e.g., service capability information) may be provided by service providers and may be consumed by service users, such as Diameter applications. In some embodiments, service routing data (e.g., historical routing information or load balancing information) may be provided or maintained by service users, such as Diameter application or components of DSR 104.

DSR 104 may include one or more DAs or nodes, such as DA 106 and 108. DAs 106 and 108 may represent any suitable entities for performing message processing, including Diameter service routing, and/or other functions described herein. For example, DA 108 may be implemented on a computing platform with one or more processors and one or more network interfaces for receiving or transmitting messages.

DAs 106 and 108 may include functionality for receiving, processing and/or sending various messages (e.g., protocol data units (PDUs)) and may include various communications interfaces for communication with Diameter nodes, e.g., 3rd Generation Partnership Project (3GPP) LTE communications interfaces and other (e.g., non-LTE) communications interfaces. In some embodiments, receiving, processing, and/or routing functionality may be included in one or more modules. For example, DA 108 may include or have access to one or more modules for receiving Diameter signaling messages associated with multiple different Diameter signaling interfaces, e.g., S9, S6a, S11, Cx, and Dx. DAs 106 and 108 may include functionality for accessing storage 126 and/or for performing enhanced service routing.

DA 106 may include a DA manager 110, one or more DA-MP(s) 112, a group of service providers for providing a service 'C' (service C group) 114, and a group of service providers for providing a service 'D' (service D group) 116. DA manager 110 may be any suitable entity (e.g., software executing on DA-MP(s) 112) for configuring, managing, or provisioning one or more aspects of DA 106. For example, DA manager 110 may include functionality for communicating with various DAs in DSR 104 and for interacting with one or more service groups. DA manager 110 may also be configured to subscribe and process service capability information from one or more service groups, generate service routing data based on service capability information, and/or store service routing data in storage 126.

DA-MP(s) 112 may represent one or more suitable entities (e.g., one or more physical processors, hardware-based circuits, field-programmable gateway arrays (FPGAs), application-specific integrated circuits (ASICs)) for processing messages. DA-MP(s) 112 may execute software or code for performing various aspects associated with enhanced service routing. For example, DA-MP(s) 112 may include one or more processes, such as a Diameter application. The Diameter application may include functionality for performing communicating and processing functions. For example, a Diameter application may perform full address based resolution and may communicate with one or more service providers in completing this resolution. In some embodiments, a Diameter application may perform functions associated with a proxy agent, a translation agent, a redirect agent, a relay agent, or a charging proxy agent. For example, a Diameter application may act a proxy for a charging binding service provider.

Service C group 114 may represent one or more service providers. Each service provider in service C group 114 may be any suitable entity (e.g., software executing on DA-MP(s) 112) for perform a particular service 'C'. For example, exemplary services performed by a member of service C group 114 may include a charging service, a session binding service, a charging binding service, a database lookup or query service, a policy service, a policy rules service, an authentication service, an accounting service, or an authorization service.

In some embodiments, service C group 114 may be associated with one or more identifiers, such as one or more group identifier (e.g., group 15), one or more physical location identifiers (e.g., an IP address or subnet, a blade or server identifier, or global positioning system (GPS) coordinates), an operational status identifier (e.g., 'available', 'congested' or 'unavailable'), and/or a redundancy status identifier (e.g., 'primary', 'backup', 'primary/backup'). In some embodiments, each service provider (e.g., a member or an instance of a service C group 114) may be associated with a unique identifier, such as a service provider identifier (SPID). For example, a SPID may be relatively unique (e.g., unique within a certain group or location) or universally unique (e.g., unique among all available or active service providers).

Service D group 116 may represent one or more service providers. Each service provider in service D group 116 may be any suitable entity (e.g., software executing on DA-MP(s) 112) for perform a particular service 'D'. For example, exemplary services performed by a member of service D group 116 may include a different service than performed by members of service C group 114. For example, if members of service C group 114 perform a charging service, members of service D group 116 may perform an authentication service.

In some embodiments, service D group 116 may be associated with one or more identifiers, such as one or more group identifiers, one or more unique identifiers (e.g., SPIDs for group members), one or more physical location identifiers, an operational status identifier, and/or a redundancy status identifier.

In some embodiments, a service group or a service provider may be associated with a plurality of DAs. For example, a service group (e.g., a service E group) may include service providers that are hosted at or by DA 106 and DA 108.

DA 108 may include a DA manager 118, one or more DA-MP(s) 120, a service C group 122, and a service D group 124. DA manager 118 may be any suitable entity (e.g., software executing on DA-MP(s) 112) for configuring, managing, or provisioning one or more aspects of DA 108 and may include functionality similar to DA manager 110. DA-MP(s) 120 may include functionality similar to DA-MP(s) 112. Members of service C group 122 may include functionality similar to members of service C group 114. In some embodiments, service C group 122 may be associated with a group identifier different from that of service C group 114. For example, as illustrated in FIG. 1, service C group 122 may be associated with group 30 and service C group 114 may be associated with group 15. Members of service D group 124 may include functionality similar to members of service D group 116. In some embodiments, service D group 124 may be associated with a group identifier different from that of service D group 116. For example, as illustrated in FIG. 1, service D group 124 may be associated with group 20 and service D group 116 may be associated with groups 15 and 20.

While FIG. 1 depicts service groups within DSR 104, it will be appreciated that some service groups, or service providers therein, may be hosted by another DSR (not shown in FIG. 1) or a node distinct from DSR 104. For example, a service provider may be associated with a subscriber profile repository (SPR) or a home subscriber server (HSS) not shown in FIG. 1.

Figure 2:
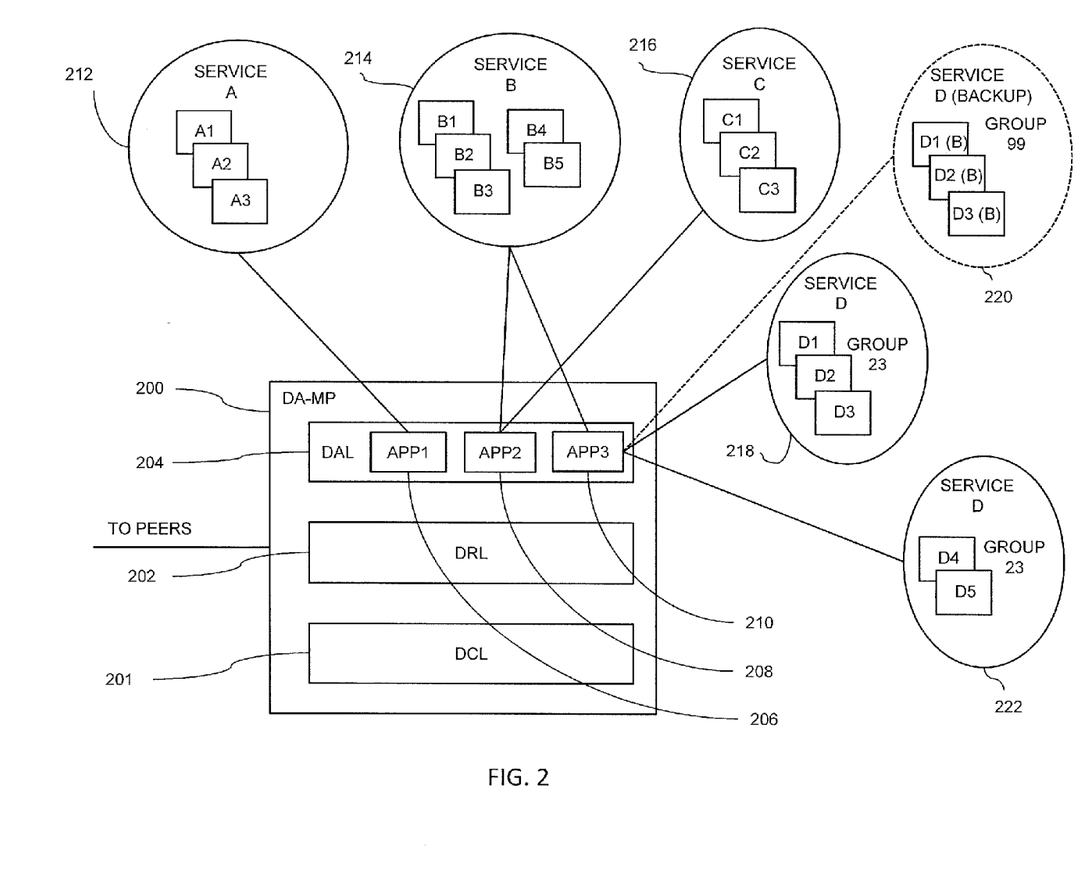
FIG. 2 is a diagram illustrating an exemplary Diameter agent message processor (DA-MP) executing some Diameter applications according to an embodiment of the subject matter described herein.

FIG. 2 is a diagram illustrating an exemplary DA-MP 200 executing some Diameter applications according to an embodiment of the subject matter described herein. DA-MP 200 may include similar functionality as described above for DA-MP(s) 112 and/or DA-MP(s) 122. In the embodiment illustrated in FIG. 2, DA-MP 200 may include and/or execute a Diameter stack, e.g., software that handles Diameter messages at different open systems interconnection (OSI) layers. In some embodiments, DA-MP 200 may support a Diameter stack that includes a Diameter connection layer (DCL) 201 for handling Diameter connections and/or communicating between various DA or Diameter nodes, a Diameter routing layer (DRL) 202 for routing request messages to peers or local applications based on message content, discarding or rejecting Diameter request messages based on message content rules, and/or peer congestion control, and a Diameter application layer (DAL) 204 for hosting various Diameter application and related functions. In some embodiments, DA-MP 200 may include different and/or additional layers having different functionality and/or may include combined layers.

DAL 204 may include one or more Diameter applications, including APP1 206, APP2 208, and APP3 210. For example, some Diameter applications (e.g., APP1 206, APP2 208, and/or APP3 210) may support, emulate, or perform functions associated with an addressable Diameter node endpoint that either originates or terminates a Diameter session (e.g., Diameter Client, Server, or Translation Agent). Some Diameter applications may support a Diameter relay agent that may or may not be an addressable Diameter node which intercepts certain types of messages and sends a response message to a peer containing new destination routing information. Another Diameter application may be a back-to-back application. The back-to-back application may terminate a Diameter session from one node, initiate a new session on behalf of the requestor, and interwork the sessions between the two nodes (e.g., AAAH Server). Some Diameter applications may insert itself in the end-to-end transaction signaling flow (Request/ Answer) and may add or modify AVPs in the message (e.g., Diameter Proxy Agent). Some Diameter applications may intercept certain messages and optionally modify messages that, for example, affects message routing, but may not remain in the end-to-end signaling.

In some embodiments, a Diameter application may request and use one or more services in performing certain functionality. For example, a Diameter application may request that a service be performed by one or more service providers. In this example, Diameter applications may use service routing information or other information for determining service topology so as to determine one or more appropriate service providers.

In some embodiments, services may be decoupled from Diameter applications. By decoupling Diameter applications and services, each of the Diameter applications and/or the services may be independently scalable (e.g., service providers may be increased or decreased based on predicted load for services), may be deployed in a flexible manner (e.g., may be deployed at various physical locations and/or different times), and may be independently made redundant (e.g., made highly available using primary and backup groups). For example, regardless of how many Diameter applications are currently in use or executing, additional service providers or service instance (e.g., D4 and D5) may be added to various service groups (e.g., service D group 23 222) so as to increase processing capacity. Moreover, by decoupling Diameter applications and services, multiple Diameter applications may request and use services from one or more service providers, thereby increasing resource efficiency. In contrast, a conventional Diameter application is coupled to or performs services that are not shared among other Diameter applications.

In the embodiment illustrated in FIG. 2, APP1 206, APP2 208, and APP3 210 may be associated with one or more service providers and/or service provider groups. For example, APP1 206 may be associated with service A group 212, APP2 208 may be associated with service B group 214 and service C group 216, and APP3 210 may be associated with service B group 214 and service D groups 218-222. In some embodiments, Diameter applications may consult one or more databases in determining which services are available to perform various services and/or in determining how to interact with relevant service providers. Each Diameter application may consult storage 126 for service routing information and use the service routing information for selecting an appropriate service provider, instance, or related group.

Diameter applications may consult one or more databases in performing load balancing. For example, each Diameter application (e.g., APP1 206) may maintain historical information and/or load balancing information. The historical information may indicate the most recently used service provider for a given service and/or the least recently used service provider. Other load balancing information may include implementations, algorithms, or formulas for distributing load among one or more service providers. Using historical information and/or load balancing information, Diameter applications may provide service requests in a balanced manner.

Service A group 212 may include multiple instances of service A, e.g., A1-A3. Each service A instance may be capable of performing a service associated with one or more Diameter messages, e.g., from DA 200 or a Diameter application executing therein. In some embodiments, service A group 212 and/or instances therein may be associated with a group. The group may be based on a physical and/or logical location. For example, every instance of service A group 212 may be executing at a same computing platform or blade. In some embodiments, Service A group 212 may be associated with a redundancy group, such as a primary or backup group.

Service B group 214 may include multiple instances of service B, e.g., B1-B5. Each service B instance may be capable of performing a service associated with one or more Diameter messages, e.g., from DA 200 or a Diameter application executing therein. In some embodiments, service B group 214 and/or instances therein may be associated with a group. The group may be based on a physical and/or logical location. For example, every instance of service B group 214 may be executing at one or more nodes that share a common subnet. In some embodiments, Service B group 214 may be associated with a redundancy group, such as a primary or backup group.

Service C group 216 may include multiple instances of service C, e.g., C1-C3. Each service C instance may be capable of performing a service associated with one or more Diameter messages, e.g., from DA 200 or a Diameter application executing therein. In some embodiments, service C group 216 and/or instances therein may be associated with a group. The group may be based on a physical and/or logical location. For example, every instance of service C group 216 may be executing at a same computing platform or blade. In some embodiments, Service C group 216 may be associated with a redundancy group, such as a primary or backup group.

Service D group 23 218 may include multiple instances of service D, e.g., D1-D3. Each service D instance may be capable of performing a service associated with one or more Diameter messages, e.g., from DA 200 or a Diameter application executing therein. In the embodiment illustrated in FIG. 2, service D group 23 218 and/or instances therein may be associated with a group '23'. Group '23' may be based on a physical and/or logical location. For example, every instance of service D group 23 218 may be executing at one or more nodes that share a common city or network therein. In the embodiment illustrated in FIG. 2, service D group 23 218 may be a primary (e.g., a non-backup) group for redundancy purposes.

Service D group 99 220 may include multiple instances of service D, e.g., D1-D3. Each service D instance may be capable of performing a service associated with one or more Diameter messages, e.g., from DA 200 or a Diameter application executing therein. In the embodiment illustrated in FIG. 2, service D group 99 220 and/or instances therein may be associated with a group '99'. Group '99' may be based on a physical and/or logical location. For example, every instance of service D group 99 220 may be executing at one or more nodes that share a common city or network therein and may be a location different from a location associated with service D group 23 218. In the embodiment illustrated in FIG. 2, service D group 99 220 may be a backup group and may be used for redundancy purposes. For example, if service D group 23 218 become unstable or goes offline, service D group 99 220 may become a primary group and handle Diameter messages from DA 200.

Service D group 23 222 may include multiple instances of service D, e.g., D4-D5. Each service D instance may be capable of performing a service associated with one or more Diameter messages, e.g., from DA 200 or a Diameter application executing therein. In the embodiment illustrated in FIG. 2, service D group 23 222 and/or instances therein may be associated with a group '23'. Group '23' may be based on a physical and/or logical location. In some embodiments, service instances may be associated with a same group but be located at different physical locations. For example, every instance of service D group 23 222 may be executing at one or more nodes located at a physical address that is different than a physical address associated with service D group 23 218. In the embodiment illustrated in FIG. 2, service D group 23 218 may be a primary (e.g., a non-backup) group.

In an exemplary Diameter message routing scenario using the embodiment illustrated in FIG. 2, a Diameter peer node (e.g., a Diameter client) may send a Diameter message to DSR 104. The Diameter message may be received by DCL 201 at DA-MP 200. DCL 201 may pass the Diameter message to DRL 202. If application processing is required, DRL 208 may forward the Diameter message to DAL 204 or a Diameter application, such as APP1 206, APP2 208, or APPS 210. For example, DRL 208 may forward the Diameter message to APP1 206, which processes the message by sending the message to instance A1. After receiving an appropriate response from A1, APP1 206 may send a processed Diameter message to DRL 208. DRL 208 may forward the Diameter message to another DA-MP or DCL 201, which may send the message to another Diameter node or destination, such as a Diameter server or Diameter client.

Figure 3:
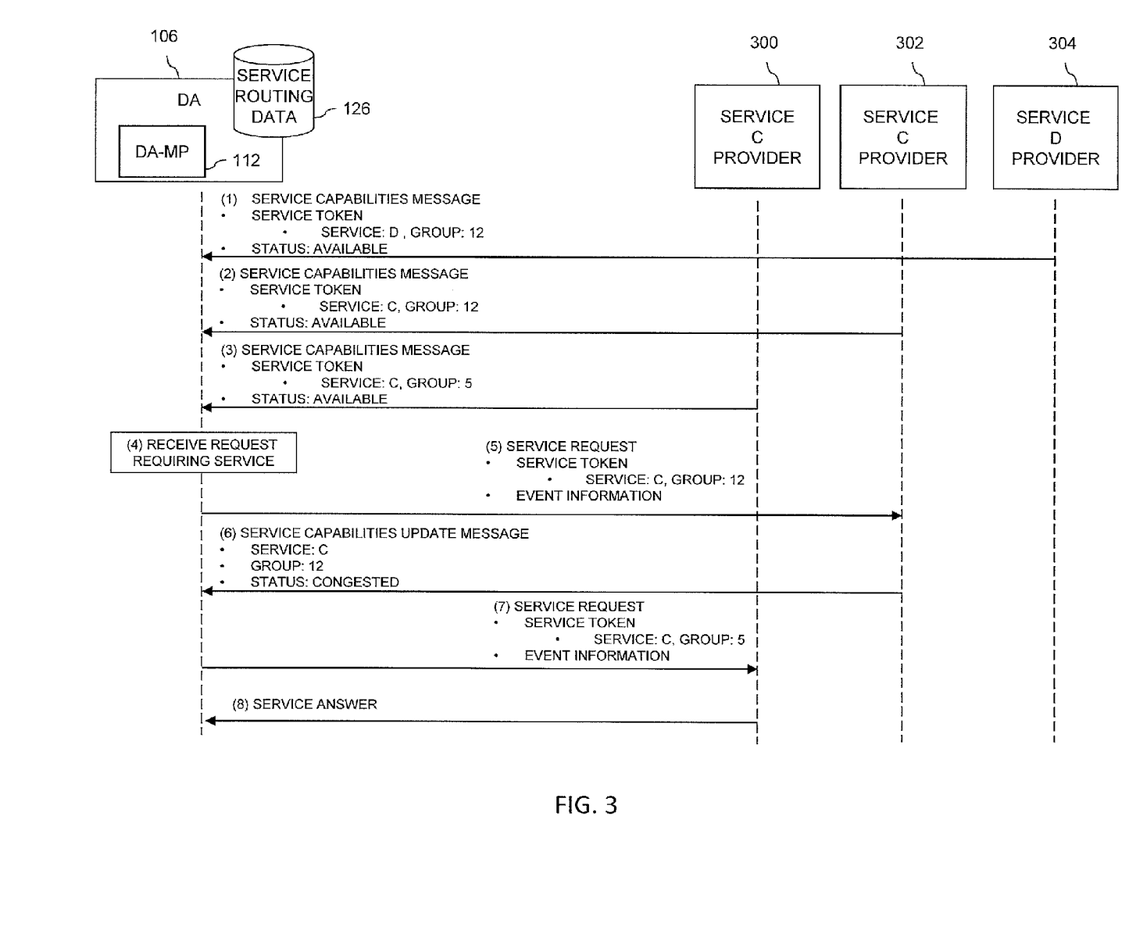
FIG. 3 is a diagram illustrating exemplary messages associated with performing enhanced service routing according to an embodiment of the subject matter described herein.

FIG. 3 is a diagram illustrating exemplary messages associated with performing enhanced service routing according to an embodiment of the subject matter described herein. In the embodiment illustrated in FIG. 3, service C providers 300 and 302 may include similar functionality as described above for members of service C group 114, service C group 122, and/or service C group 216 and service D provider 304 may include similar functionality as described above for members of service D group 116, service D group 124, and/or service D groups 218-222. In some embodiments, service C providers 300 and/or 302 may be hosted by DSR 104, or a component therein (e.g., DA 106), or may be hosted by a node distinct from DSR 104 (e.g., an HSS).

In some embodiments, DA 106 may be configured to request or subscribe to one or more service providers. For example, DA 106 may send a message to each service provider in a location or network. The message may be for request service capability information, such as services performed by service provider, group or location identifiers, and status information. In some embodiments, DA 106 may provide a subscription request for service capability information and updates from service providers. In some embodiments, DA 106 may send an information request for service capability information and additional requests for updates from service providers. In some embodiments, interactions and service capability information may be exchanged dynamically and may be usable for identifying a service topology and/or other service routing data. For example, if one or more service instances become unavailable, the service instances may publish or send an update message to DA 106 or DSR 104 indicating the unavailability and subsequent service routing may be adjusted in response to this service topology change.

At steps 1-3, in response to DA 106 or a related component (e.g., DSR 104 or a process executing at DA 106) requesting service capability information, service D provider 304 and service C providers 300 and 302 may provide service capabilities messages. Each service capability message may include information for indicating capabilities and related information of a service provider. For example, service capabilities message from service D provider 304 may include a service token and information indicating an 'available' status. The service token may indicate a service type or identifier, a unique identifier (e.g., a SPID), a group identifier, and/or a redundancy identifier. As illustrated in FIG. 3, service D provider 304 may provide a service token indicating a service type of D' and a group identifier of '12', service C provider 302 may provide a service token indicating a service type of and a group identifier of '12', and service C provider 300 may provide a service token indicating a service type of 'C' and a group identifier of '12'.

After receiving the service capabilities messages, DA 106 or a related component may use service capability information received from the messages to generate and/or update service routing data, e.g., stored at storage 126. In some embodiments, historical information and/or load balancing information may be used in generating and/or updating service routing data. For example, a Diameter application may update a priority or preference flag associated with a certain service provider if historical routing information indicates that the service provider should be used next if all other criteria are met.

At step 4, DA 106 may receive a Diameter message (e.g., from a Diameter peer node via a Diameter interface). The Diameter message may require one or more services. For example, a Diameter message may be addressed to a destination using a local (e.g., to DSR 104 or core network) naming convention. In this example, the Diameter message may be received by a Full Address Based Resolution (FABR) Diameter application. The FABR Diameter application may be configured to determine one or more service providers, such as an IMSI resolution service provider or a DN resolution service provider, for resolving the destination address. After determining the one or more service providers, the FABR Diameter application may send the Diameter message or a portion of the Diameter message (e.g., a destination address) to the one or more service providers.

At step 5, a service request may be sent from DA 106 to service C provider 302. The service request may include a service token and event information. In some embodiments, the event information may include information from a Diameter message that is to be analyzed and/or processed. For example, if service C provider 302 is a database query service, the event information may include a key, a criterion, or other information from the Diameter message of step 4 and may be used service C provider 302 in identifying information during a database lookup.

In some embodiments, service C provider 302 may be unable to process the service request and may send an error message and/or other responses. In some embodiments, service C provider 302 may send a message (e.g., a service capabilities update message) to DA 106 indicating that capabilities associated with service C provider 302 have changed and may include relevant service capability information indicating such changes.

At step 6, a service capabilities update message may be sent from service C provider 302 to DA 106. The service capabilities update message may indicate that service C provider 302 is currently congested. In some embodiments, the service capabilities update message may be in additional to or in lieu of a response message, such as an error message or other message indicating that the service associated with the service request of step 5 cannot be performed.

In response to receiving an indication that the service cannot be performed, DA 106 may perform additional service routing functions. For example, DA 106 may update service routing data with newly obtained service capability information and may determine a different or new service provider for performing the appropriate service. In this example, after determining a new service provider, a new service request may be sent to the new service provider.

At step 7, a service request may be sent from DA 106 to service C provider 300. The service request may include a service token and event information. In some embodiments, the event information may include information from a Diameter message that is to be analyzed and/or processed. For example, if service C provider is a DN resolution service, the event information may include domain related information from the Diameter message of step 4 and may resolve that information into a domain name using one or more databases or repositories.

Service C provider 300 may receive the service request and perform a requested service. In some embodiments, after performing the service request, service C provider 300 may provide the service request or a related processing request to one or more additional service providers. The one or more additional service providers may be determined using information received in the original service request and/or from information determined by service C provider 300. For example, a service request may include a DN number and subscriber related information and may be sent to service C provider 300 for performing DN resolution. After performing DN resolution, service C provider 300 may inform DA 106 of a resolved DN and/or may send the service request or related message to service D provider 304 for performing IMSI resolution, e.g., service D provider 304 may use the subscriber related information to identify an appropriate IMSI.

At step 8, after receiving and processing the service request, a service answer message may be sent from service C provider 300 to DA 106. The service answer message may include information indicating that a requested service has been performed and/or related information, e.g., the response message may include information determined, identified, or otherwise gathered by service C provider 300.

Figure 4:
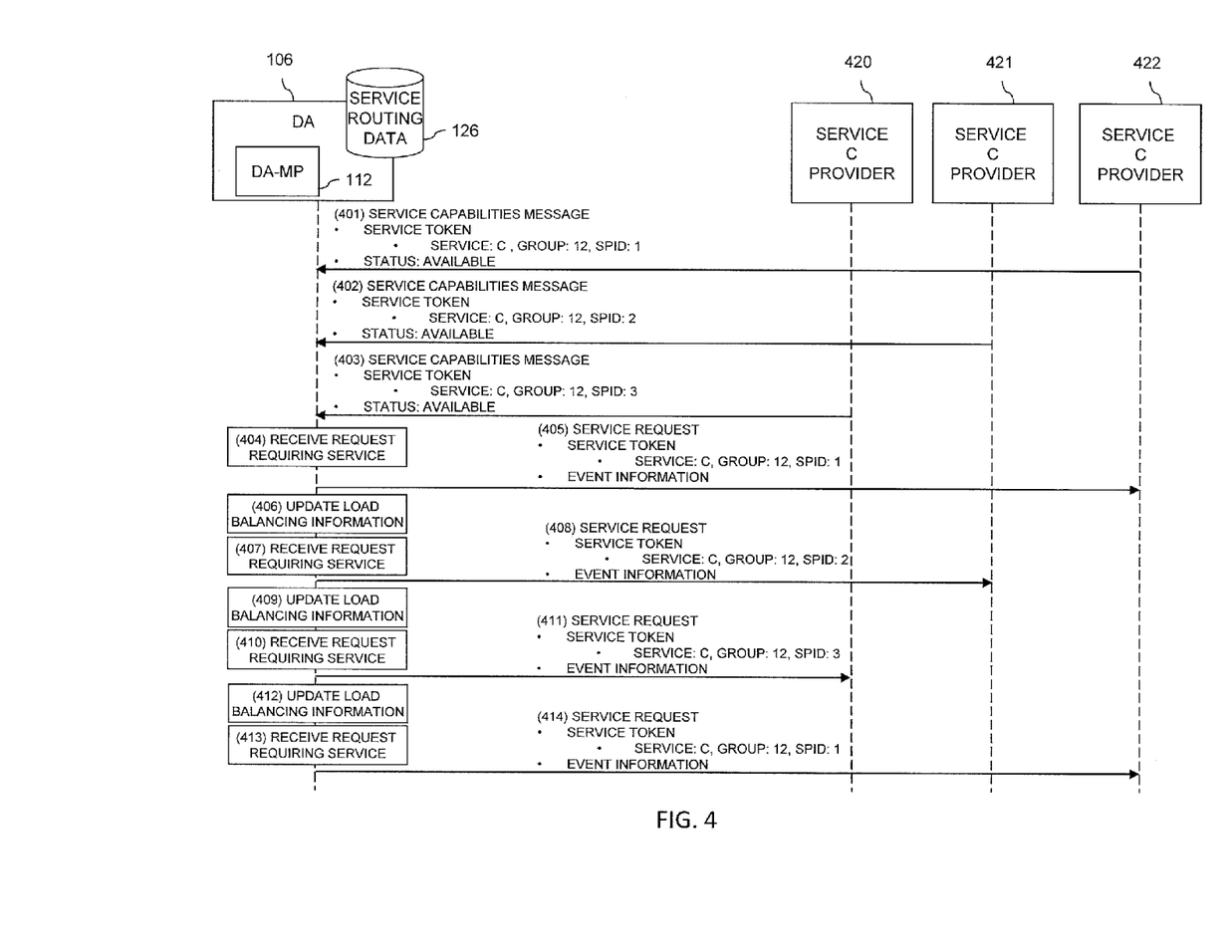
FIG. 4 is a diagram illustrating exemplary messages associated with load balancing service requests according to an embodiment of the subject matter described herein.

FIG. 4 is a diagram illustrating exemplary messages associated with load balancing service requests according to an embodiment of the subject matter described herein. In the embodiment illustrated in FIG. 4, service C providers 420, 421, and 422 may include similar functionality as described above for members of service C group 114, service C group 122, and/or service C group 216. In some embodiments, some of service C providers 420, 421, and 422 may be hosted by DSR 104, or a component therein (e.g., DA 106), or may be hosted by a node distinct from DSR 104 (e.g., an HSS). In some embodiments, service C providers 420, 421, and 422 may be part of a same group (e.g., group 12) and may each be associated with a unique identifier, such as a SPID.

In some embodiments, DA 106, DSR 104, or a Diameter application may be configured to perform load balancing associated with service requests. For example, a Diameter application (e.g., executing on DA-MP 112) may be configured to distribute (e.g., equally, unequally, or in another manner) service requests among a plurality of service providers. In this example, the Diameter application may maintain load balancing information or may consult storage 126 for such information. Exemplary load balancing information may include historical routing information and/or load balancing techniques or algorithms. Historical routing information may include or indicate a most recently used service provider, a least recently used service provider, and/or a recent history of which service providers received and/or processed service requests. Other load balancing information may include one or more load balancing techniques or algorithms (e.g., round robin, location-based, load-based, resource-based, etc.) for providing service requests among multiple service providers. By using historical routing information and/or load balancing information, a Diameter application may load balance a number of service requests by identifying a least recently used service provider and providing the service request to the least recently used service provider.

At steps 401-403, in response to DA 106 or a related component (e.g., DSR 104 or a process executing at DA 106) requesting service capability information, service C providers 420, 421, and 422 may provide service capabilities messages. Each service capability message may include information for indicating capabilities and related information of a service provider. For example, service capabilities message from service C provider 422 may include a service token and information indicating an 'available' status. The service token may indicate a service type or identifier, a unique identifier (e.g., a SPID), a group identifier, and/or a redundancy identifier. As illustrated in FIG. 4, service C provider 422 may provide a service token indicating a service type of 'C' and a group identifier of '12', and a SPID of '1', service C provider 421 may provide a service token indicating a service type of 'C' and a group identifier of '12', and a SPID of '2', and service C provider 422 may provide a service token indicating a service type of 'C' and a group identifier of '12', and a SPID of '3'.

After receiving the service capabilities messages, DA 106 or a related component may use service capability information received from the messages to generate and/or update service routing data, e.g., stored at storage 126. In some embodiments, load balancing information may be used in generating and/or updating service routing data. For example, a Diameter application may update a priority or preference flag associated with a certain service provider if historical routing information indicates that the service provider should be used next if all other criteria are met.

At step 404, DA 106 may receive a Diameter message (e.g., from a Diameter peer node via a Diameter interface). The Diameter message may require one or more services. For example, a Diameter message may be addressed to a destination using a local (e.g., to DSR 104 or core network) naming convention. In this example, the Diameter message may be received by a Diameter application. The Diameter application may be configured to determine one or more service providers, such as an IMSI resolution service provider or a DN resolution service provider, for resolving the destination address. After determining the one or more service providers, the Diameter application may send the Diameter message or a portion of the Diameter message (e.g., a destination address) to the one or more service providers.

At step 405, a service request may be sent from DA 106 to service C provider 422. The service request may include a service token and event information. In some embodiments, the event information may include information from a Diameter message that is to be analyzed and/or processed. For example, if service C provider 422 is a database query service, the event information may include a key, a criterion, or other information from the Diameter message of step 4 and may be used service C provider 422 in identifying information during a database lookup.

In some embodiments, after receiving and processing the service request, a service answer message may be sent from service C provider 422 to DA 106. The service answer message may include information indicating that a requested service has been performed and/or related information, e.g., the response message may include information determined, identified, or otherwise gathered by service C provider 422.

At step 406, load balancing information may be updated and may be used in generating and/or updating service routing data. For example, prior to, concurrently with, or after sending a service request, a Diameter application executing at DA 106 may update historical routing information in a table or other memory (e.g., at storage 126). In another example, after receiving a service answer message, a Diameter application executing at DA 106 may update historical routing information in a table or other memory (e.g., at storage 126). The updated historical routing information may include a timestamp associated with the service request and/or a service answer message indicating that service C provider 422 has been recently utilized. The updated historical routing information may also include a timestamp associated with a previously sent or processed message indicating that service C provider 422 is the least recently utilized service provider providing service 'C' (e.g., of the service providers that are currently available and associated with group 12).

At step 407, DA 106 may receive another Diameter message. The Diameter message may require one or more services. A Diameter application may use the historical routing information along with service capability information in determining one or more service providers. After determining the one or more service providers, the Diameter application may send the Diameter message or a portion of the Diameter message to the one or more service providers.

At step 408, a service request may be sent from DA 106 to service C provider 421. The service request may include a service token and event information. In some embodiments, the event information may include information from a Diameter message that is to be analyzed and/or processed. Service C provider 421 may receive the service request and perform a requested service. In some embodiments, after performing the service request, service C provider 421 may provide the service request or a related processing request to one or more additional service providers.

In some embodiments, after receiving and processing the service request, a service answer message may be sent from service C provider 421 to DA 106. The service answer message may include information indicating that a requested service has been performed and/or related information, e.g., the response message may include information determined, identified, or otherwise gathered by service C provider 421.

At step 409, load balancing information may be updated and may be used in generating and/or updating service routing data. The updated historical routing information may include a timestamp associated with the service request and/or a service answer message indicating that service C provider 421 has been recently utilized. The updated historical routing information may also include a timestamp associated with a previously sent or processed message indicating that service C provider 420 is the least recently utilized service provider providing service 'C'.

At step 410, DA 106 may receive another Diameter message. The Diameter message may require one or more services. A Diameter application may use the historical routing information along with service capability information in determining one or more service providers. After determining the one or more service providers, the Diameter application may send the Diameter message or a portion of the Diameter message to the one or more service providers.

At step 411, a service request may be sent from DA 106 to service C provider 420. The service request may include a service token and event information. In some embodiments, the event information may include information from a Diameter message that is to be analyzed and/or processed. Service C provider 420 may receive the service request and perform a requested service. In some embodiments, after performing the service request, service C provider 420 may provide the service request or a related processing request to one or more additional service providers.

In some embodiments, after receiving and processing the service request, a service answer message may be sent from service C provider 420 to DA 106. The service answer message may include information indicating that a requested service has been performed and/or related information, e.g., the response message may include information determined, identified, or otherwise gathered by service C provider 420.

At step 412, load balancing information may be updated and may be used in generating and/or updating service routing data. The updated historical routing information may include a timestamp associated with the service request and/or a service answer message indicating that service C provider 420 has been recently utilized. The updated historical routing information may also include a timestamp associated with a previously sent or processed message indicating that service C provider 422 is the least recently utilized service provider providing service 'C'.

At step 413, DA 106 may receive another Diameter message. The Diameter message may require one or more services. A Diameter application may use the historical routing information along with service capability information in determining one or more service providers. After determining the one or more service providers, the Diameter application may send the Diameter message or a portion of the Diameter message to the one or more service providers.

At step 414, a service request may be sent from DA 106 to service C provider 422. The service request may include a service token and event information. In some embodiments, the event information may include information from a Diameter message that is to be analyzed and/or processed. Service C provider 422 may receive the service request and perform a requested service. In some embodiments, after performing the service request, service C provider 422 may provide the service request or a related processing request to one or more additional service providers.

It will be appreciated that FIG. 4 is illustrative and that additional and/or different steps or messages may occur when performing load balancing. Further, it will be appreciated that various steps may occur in a different order than illustrated in FIG. 4. For example, multiple Diameter request messages may be received prior to a Diameter application sending one or more service requests to one or more of service C providers 420, 421, and 422.

Figure 5:
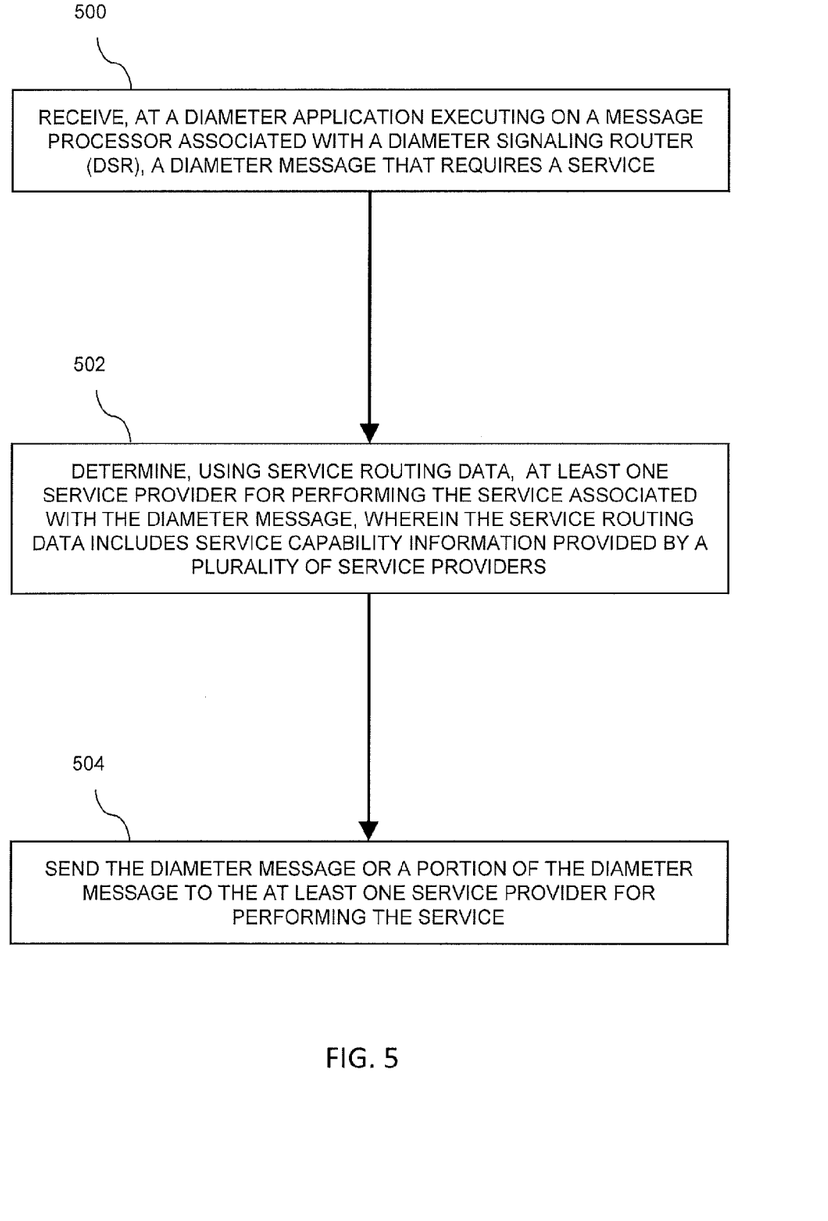
FIG. 5 is a diagram illustrating an exemplary process for performing enhanced service routing according to an embodiment of the subject matter described herein.

FIG. 5 is a diagram illustrating an exemplary process for performing enhanced service routing according to an embodiment of the subject matter described herein. In some embodiments, the exemplary process described herein, or portions thereof, may be performed at or performed by DSR 104, DA 106, DA 108, DA-MP(s) 112, DA-MP(s) 120, a Diameter agent, a Diameter application, a Diameter node, and/or another module or node.

Referring to the embodiment illustrated in FIG. 5, at step 500, a Diameter message may be received. For example, a Diameter request message originating from a Diameter client may be received at a Diameter application executing DA-MP 112.

At step 502, at least one service provider may be determined using service routing data. In some embodiments, the service routing data may include service capability information provided by a plurality of service providers. In some embodiments, the service routing data may also include historical information or load balancing information. For example, a Diameter application may query service routing data at storage 126. The service routing data may indicate that three service providers are configured to perform a needed service, but only service C provider 300 is currently online and/or available. In this example, the Diameter message may select service C provider 300 to perform the service. In another example, a Diameter application may query service routing data at storage 126. The service routing data may indicate that five service providers are configured to perform a service needed. The service routing data may also include historical routing data indicating that of the five service providers, service C provider 300 is the least recently used. By using historical routing data and/or a load balancing algorithm, service users (e.g., a Diameter application) may load balance by distributing load (e.g., service requests) among a plurality of service providers.

At step 504, the Diameter message or a portion of the Diameter message may be sent to the at least one service provider for performing the service. In some embodiments, a response message from the at least one service provider may be sent from the at least one service provider. The response message may be received at the Diameter application.

In some embodiments, at least one service provider may be a local application that is hosted by the DSR (e.g., at DA-MP (s) 120).

In some embodiments, at least one service provider may be an application that is hosted by a node distinct from DSR 104.

For example, the service provider application may be hosted by a different DSR or another node, such as an application server.

In some embodiments, service capability information may include operational status information, availability information, preference information, redundancy status information, processing capacity information, congestion information, physical location information, or grouping information about one or more services associated with one or more of a plurality of service providers.

In some embodiments, service capability information may be provided to DSR 104, a Diameter application, a MP, DA-MP(s) 112, or DA-MP(s) 120 periodically, aperiodically, or dynamically.

In some embodiments, DSR 104, a Diameter application, a MP, DA-MP(s) 112, or DA-MP(s) 120 may subscribe to a plurality of service providers and the plurality of service providers may send service capability information to DSR 104, a Diameter application, a MP, DA-MP(s) 112, or DA-MP(s) 120.

In some embodiments, determining, using service routing data, at least one service provider may include selecting the at least one service provider based on at least one of operational status information, availability information, preference information, redundancy status information, processing capacity information, congestion information, physical location information, historical routing information, load balancing information, or grouping information associated with a plurality of service providers.

In some embodiments, service routing data may include historical information or load balancing information maintained by the Diameter application.

In some embodiments, determining, using service routing data, at least one service provider may include performing load balancing using historical information or load balancing information.

In some embodiments, at least one service provider may perform services associated with multiple Diameter applications or Diameter message processors. For example, a service provider may handle service requests from multiple Diameter applications or message processors In some embodiments, a Diameter application or DSR 104 may act as a proxy for the at least one service provider.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for performing enhanced service routing at a Diameter signaling router (DSR), the method comprising:
receiving, at a Diameter application executing on a Diameter message processor associated with the DSR, a Diameter message that requires a service;
determining, using service routing data, at least one service provider for performing the service associated with the Diameter message, wherein the service routing data includes service capability information provided by a plurality of service providers; and
sending the Diameter message or a portion of the Diameter message to the at least one service provider for performing the service.

2. The method of claim 1 comprising receiving, at the Diameter application and after performing the service, a response message from the at least one service provider.

3. The method of claim 1 wherein the at least one service provider is a local application that is hosted by the DSR.

4. The method of claim 1 wherein the at least one service provider is an application that is hosted by a node distinct from the DSR.

5. The method of claim 1 wherein the service capability information includes operational status information, availability information, preference information, redundancy status information, processing capacity information, congestion information, physical location information, or grouping information about one or more services associated with one or more of the plurality of service providers.

6. The method of claim 1 wherein the service routing data includes historical information or load balancing information maintained by the Diameter application.

7. The method of claim 6 wherein determining, using service routing data, the at least one service provider includes performing load balancing using the historical information or the load balancing information.

8. The method of claim 1 wherein the service capability information is provided to the DSR, the Diameter application, or the Diameter message processor periodically, aperiodically, or dynamically.

9. The method of claim 1 wherein the DSR, the Diameter application, or the Diameter message processor subscribes to the plurality of service providers and wherein the plurality of service providers sends service capability information to the DSR, the Diameter application, or the Diameter message processor.

10. The method of claim 1 wherein determining, using service routing data, the at least one service provider includes selecting the at least one service provider using at least one of operational status information, availability information, preference or priority information, redundancy status information, processing capacity information, congestion information, physical location information, historical routing information, load balancing information, or grouping information associated with the plurality of service providers.

11. The method of claim 1 wherein the at least one service provider performs service processing associated with multiple Diameter applications or Diameter message processors.

12. The method of claim 1 wherein the Diameter application or the DSR acts as a proxy for the at least one service provider.

13. A system for performing enhanced service routing at a Diameter signaling router (DSR), the system comprising:
a DSR comprising:
a non-transitory computer readable medium configured to store service routing data, wherein the service routing data is based on service capability information provided by a plurality of service providers; and
a Diameter message processor associated with the DSR and configured to:
receive, at a Diameter application executing on the Diameter message processor associated with the DSR, a Diameter message that requires a service,
determine, using service routing data, at least one service provider for performing the service associated with the Diameter message, wherein the service routing data includes service capability information provided by a plurality of service providers, and
send the Diameter message or a portion of the Diameter message to the at least one service provider for performing the service.

14. The system of claim 13 wherein the DSR is configured to receive, at the Diameter application and after performing the service, a response message from the at least one service provider.

15. The system of claim 13 wherein the at least one service provider is a local application that is hosted by the DSR.

16. The system of claim 13 wherein the at least one service provider is an application that is hosted by a node distinct from the DSR.

17. The system of claim 13 wherein the service capability information includes operational status information, availability information, preference information, redundancy status information, processing capacity information, congestion information, physical location information, or grouping information about one or more services associated with one or more of the plurality of service providers.

18. The system of claim 13 wherein the service routing data includes historical information or load balancing information maintained by the Diameter application.

19. The system of claim 18 wherein the Diameter message processor is configured to perform load balancing using the historical information or the load balancing information.

20. The system of claim 13 wherein the service capability information is provided to the DSR, the Diameter application, or the Diameter message processor periodically, aperiodically, or dynamically.

21. The system of claim 13 wherein the DSR, the Diameter application, or the Diameter message processor subscribes to the plurality of service providers and wherein the plurality of service providers sends service capability information to the DSR, the Diameter application, or the Diameter message processor.

22. The system of claim 13 wherein the Diameter message processor is configured to select the at least one service provider using at least one of operational status information, preference or priority information, redundancy status information, processing capacity information, congestion information, physical location information, historical information, load balancing information, or grouping information associated with the plurality of service providers.

23. The system of claim 13 wherein the at least one service provider performs service processing associated with multiple Diameter applications or Diameter message processors.

24. The system of claim 13 wherein the Diameter application or the DSR acts as a proxy for the at least one service provider.

25. A non-transitory computer readable medium comprising computer executable instructions that when executed by a processor of a computer control the computer to perform steps comprising:
- receiving, at a Diameter application executing on a Diameter message processor associated with a Diameter signaling router (DSR), a Diameter message that requires a service;
- determining, using service routing data, at least one service provider for performing the service associated with the Diameter message, wherein the service routing data includes service capability information provided by a plurality of service providers; and
- sending the Diameter message or a portion of the Diameter message to the at least one service provider for performing the service.

* * * * *